(12) United States Patent
Nakagawa

(10) Patent No.: US 11,581,823 B2
(45) Date of Patent: Feb. 14, 2023

(54) ACTUATOR AND ACTUATOR MANUFACTURING METHOD

(71) Applicant: TOYOTA JIDOSHA KABUSHIKI KAISHA, Toyota (JP)

(72) Inventor: Shuji Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 17/169,630

(22) Filed: Feb. 8, 2021

(65) Prior Publication Data

US 2021/0265922 A1 Aug. 26, 2021

(30) Foreign Application Priority Data

Feb. 20, 2020 (JP) .............................. JP2020-027507
Oct. 23, 2020 (JP) .............................. JP2020-178225

(51) Int. Cl.
*H02N 1/00* (2006.01)

(52) U.S. Cl.
CPC .................................. *H02N 1/002* (2013.01)

(58) Field of Classification Search
CPC ......... H02N 11/00; H02N 1/002; H02N 41/08
USPC ........................................................ 310/309
See application file for complete search history.

(56) References Cited

U.S. PATENT DOCUMENTS

| | | | | |
|---|---|---|---|---|
| 4,266,339 A * | 5/1981 | Kalt | ........................... | E06B 9/24 29/829 |
| 6,485,273 B1 * | 11/2002 | Goodwin-Johansson | ................... | F04D 33/00 310/309 |
| 6,646,364 B1 * | 11/2003 | Horning | ................... | H02N 1/006 310/309 |
| 6,713,939 B2 * | 3/2004 | Kasahara | .................. | G03B 1/00 310/309 |
| 7,618,474 B2 * | 11/2009 | Akimoto | .................... | H01G 4/30 75/252 |
| 7,625,075 B2 * | 12/2009 | Faase | ...................... | B41J 2/1628 347/68 |
| 8,008,835 B2 * | 8/2011 | Degertekin | ........... | B06B 1/0292 310/309 |
| 10,355,624 B2 * | 7/2019 | Majidi | ..................... | F16D 28/00 |
| 10,840,555 B2 * | 11/2020 | Iwama | ................ | H01M 50/534 |

(Continued)

FOREIGN PATENT DOCUMENTS

| | | | | |
|---|---|---|---|---|
| JP | 2012-161957 A | | 8/2012 | |
| JP | 2015-018911 | * | 1/2015 | ............... H05K 3/12 |

(Continued)

*Primary Examiner* — Burton S Mullins

(74) *Attorney, Agent, or Firm* — Oliff PLC

(57) ABSTRACT

An actuator includes a base electrode, a counter electrode facing the base electrode, a first terminal connected to the base electrode, and a second terminal connected to the counter electrode. The base electrode includes a non-metal base material, a conductive thin film disposed on a side of the non-metal base material, the side facing the counter electrode, and an insulation layer disposed on the conductive thin film. The first terminal is connected to the conductive thin film. The counter electrode includes a flexible conductor that is deformable via a Coulomb force acting between the base electrode and the counter electrode upon application of a voltage to the first terminal and the second terminal.

14 Claims, 14 Drawing Sheets

(56) References Cited

U.S. PATENT DOCUMENTS

| | | | |
|---|---|---|---|
| 2003/0053227 A1* | 3/2003 | Kaneko | H02N 1/006 |
| | | | 310/309 |
| 2006/0168788 A1* | 8/2006 | Tilmans | H01G 5/40 |
| | | | 29/25.35 |
| 2007/0090732 A1* | 4/2007 | Langseth | G02B 26/0841 |
| | | | 359/290 |
| 2020/0185590 A1* | 6/2020 | Malhotra | G02B 27/0172 |

FOREIGN PATENT DOCUMENTS

| | | |
|---|---|---|
| JP | 5714200 B2 | 5/2015 |
| WO | 01/06575 A1 | 1/2001 |
| WO | 2021/015202 A1 | 1/2021 |

* cited by examiner

ACTUATOR AND ACTUATOR MANUFACTURING METHOD

CROSS-REFERENCE TO RELATED APPLICATION

This application claims priority to Japanese Patent Application No. 2020-027507 filed on Feb. 20, 2020 and Japanese Patent Application No. 2020-178225 filed on Oct. 23, 2020 each incorporated herein by reference in its entirety.

BACKGROUND

1. Technical Field

The present disclosure relates to an actuator and an actuator manufacturing method.

2. Description of Related Art

Japanese Patent No. 5714200 discloses a generator and a transducer in which a polymer is provided between two electrodes. Japanese Patent No. 5714200 discloses that in the generator and the transducer, a Coulomb force of accumulated charge between the two electrodes, the Coulomb force being generated upon application of a voltage to the electrodes, causes the electrodes to be attracted to each other and the polymer deforms accordingly, providing displacement of the electrodes.

Japanese Patent Application Publication No. 2012-161957 discloses a method for transferring a ceramic film subjected to high-temperature treatment onto a low heat-resistance base material. In Japanese Patent Application Publication No. 2012-161957, for example, a polyimide film is formed on a support. A solution of a metal salt such as metal alkoxide or metal chloride salt is applied to the polyimide film and then the polyimide film is fired by being heating to 500° C. or higher. Consequently, a ceramic film of e.g., titanium oxide or indium tin oxide is formed on the polyimide film. Then, the ceramic film is transferred onto a low heat-resistance base material of, e.g., plastic.

SUMMARY

In the configuration disposed in Japanese Patent No. 5714200, displacement provided by the actuator involves compressive deformation of the polymer. By means of such deformation, the actuator is less likely to provide large displacement. Also, depending on the usage, the actuator needs to be light in weight.

Work provided by an actuator can be performance for which a generated force and a magnitude of a displacement are important. According to the present inventor's knowledge, in an actuator with a dielectric elastic body sandwiched between a pair of electrodes, there is an antinomic relationship between a generated force and a magnitude of a displacement. A generated force F is expressed by $F=QE=(CV) \times (V/d)$. Here, Q is accumulated charge, E is a field intensity, C is a capacitance of a dielectric elastic body, d is an interelectrode distance and V is an applied voltage. In other words, the interelectrode distance d is determined by a thickness of the dielectric elastic body. In order to obtain a large displacement, it is necessary to increase the thickness of the dielectric elastic body (≈the interelectrode distance d). However, as the thickness of the dielectric elastic body (≈the interelectrode distance d) is larger, the generated force F becomes smaller. Therefore, with an actuator in which a dielectric elastic body is simply sandwiched between a pair of electrodes, it is difficult to obtain a large displacement. Also, there are few materials exhibiting high relative permittivity, for dielectric elastomers that can be used for the dielectric elastic body, resulting in difficulty to ensure sufficient performance. From such perspective, the present inventor proposes a novel actuator structure.

An actuator disclosed here includes a base electrode, a counter electrode facing the base electrode, a first terminal connected to the base electrode, and a second terminal connected to the counter electrode. The base electrode includes a non-metal base material, a conductive thin film disposed on a side of the non-metal base material, the side facing the counter electrode, and an insulation layer disposed on the conductive thin film. The first terminal is connected to the conductive thin film. The counter electrode includes a flexible conductor that is deformable via a Coulomb force acting between the base electrode and the counter electrode upon application of a voltage to the first terminal and the second terminal. In the above actuator, the base electrode includes a non-metal base material, enabling reduction in weight. Also, driving of the actuator does not involve large compressive deformation of the insulation layer, enabling providing a large displacement relative to a generated Coulomb force.

A plurality of the base electrodes may be arranged so as to face one another in turn. The counter electrode may be disposed between the base electrodes.

Also, in the base electrode, the non-metal base material may include a side having an uneven shape, the side facing the counter electrode, the conductive thin film may cover the uneven shape, and the insulation layer may cover the conductive thin film.

The insulation layer may be a ceramic thin film. The insulation layer may have a perovskite structure. The insulation layer may be a non-woven fabric. A conductive paste or a conductive gel may be disposed between the conductive thin film and the insulation layer. A cured conductive material may be disposed between the conductive thin film and the insulation layer. The conductive thin film may be a metal thin film. The counter electrode may include an elastomer containing a conductive material.

The actuator may further include: a power supply that applies a voltage to the conductive thin film and to the counter electrode; and a first switch that switches between connection and disconnection between the conductive thin film and the counter electrode, and the power supply. Also, the actuator may further include a control device that operates the first switch. Also, the actuator may further include: a connection wiring that electrically connects the conductive thin film and the counter electrode with the power supply not interposed between the conductive thin film and the counter electrode; and a second switch that is provided at the connection wiring and switches between a state in which the conductive thin film and the counter electrode are electrically connected via the connection wiring and a state in which the connection wiring is disconnected. Also, the actuator may further include a control device configured such that when the first switch is closed, the second switch is open and when the first switch is open, the second switch is closed.

As another form, the actuator may further include: a first grounding wire that grounds the conductive thin film; a second grounding wire that grounds the counter electrode; a third switch that is provided at the first grounding wire and switches between connection and disconnection of the first grounding wire; and a fourth switch that is provided at the second grounding wire and switches between connection and disconnection of the second grounding wire. The actuator may further include a control device configured such that when the first switch is closed, the third switch and the fourth switch are open and when the first switch is open, the third switch and the fourth switch are closed.

An actuator manufacturing method includes: a step of preparing a non-metal base material formed in a predetermined shape; a step of disposing a conductive thin film on a surface in a predetermined area of the non-metal base material; and, a step of disposing an insulation layer on the conductive thin film. The above actuator manufacturing method enables reduction in weight of the actuator.

Here, the insulation layer may be provided using a ceramic thin film. In this case, in the step of disposing an insulation layer on the conductive thin film, the ceramic thin film may be disposed on the conductive thin film. Also, the ceramic thin film may be a non-woven fabric. A conductive paste or a conductive gel may be applied to at least one of the conductive thin film and the ceramic thin film. Then, the ceramic thin film may be disposed on the conductive thin film. Furthermore, the actuator manufacturing method may include a step of curing the conductive paste or the conductive gel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the actuator disposed here will be described. It should be understood that the embodiments described here are not intended to specifically limit the present disclosure. The present disclosure is not limited to the embodiments described here unless otherwise specifically noted.

Actuator 10

Figure 1:
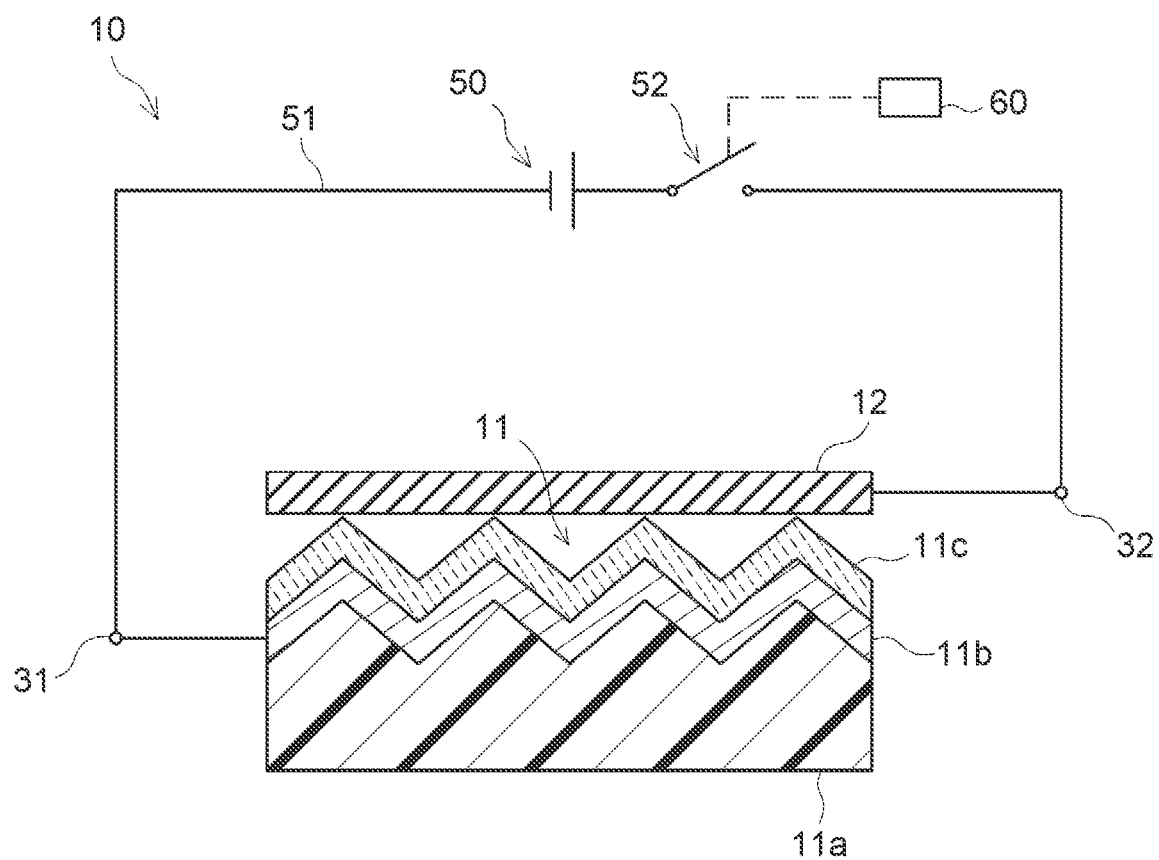
FIG. 1 is a schematic diagram of an actuator 10.
Figure 2:
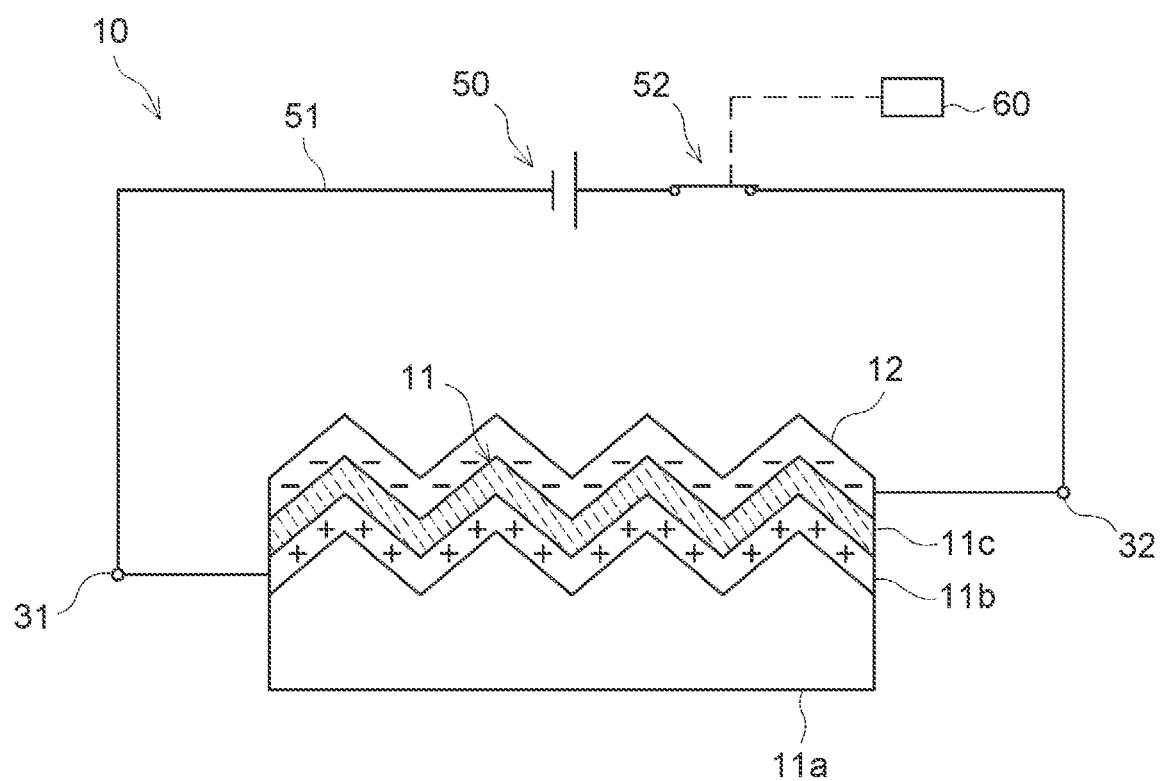
FIG. 2 is a schematic diagram of the actuator 10.
Figure 3:
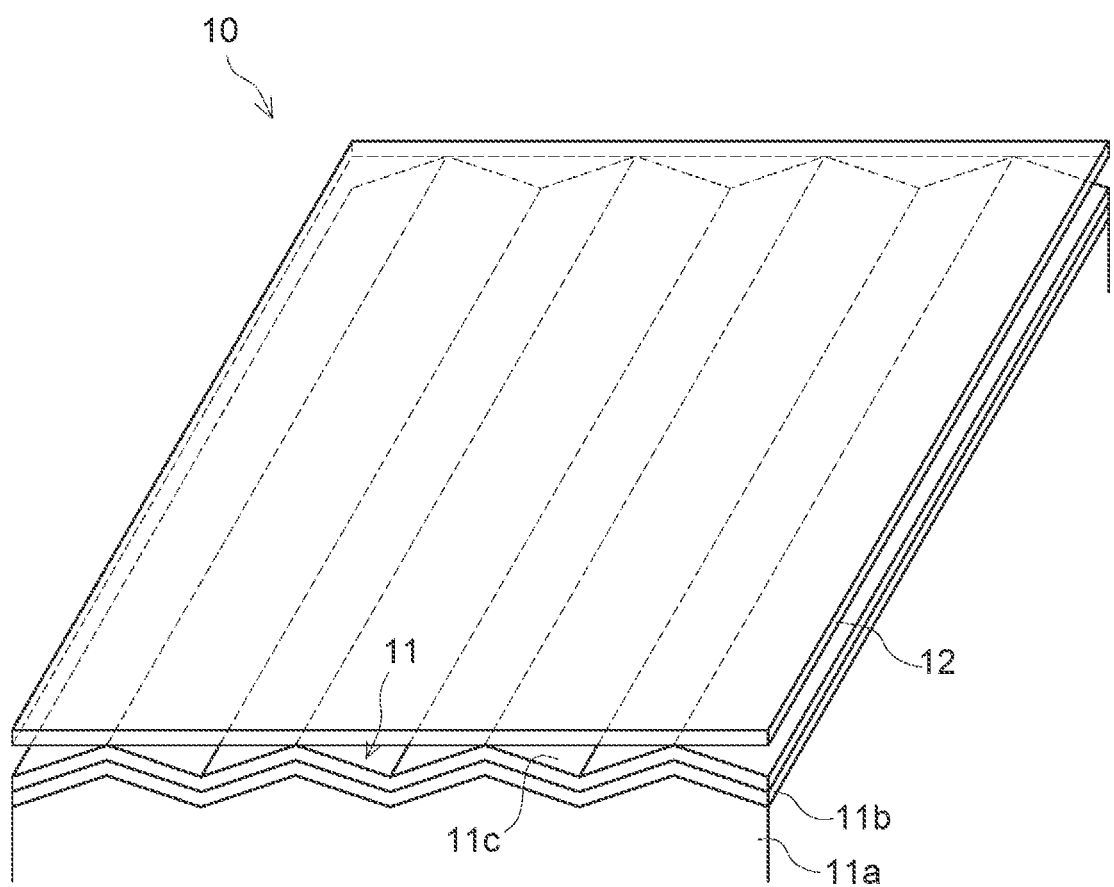
FIG. 3 is a perspective diagram schematically illustrating the actuator 10.
Figure 4:
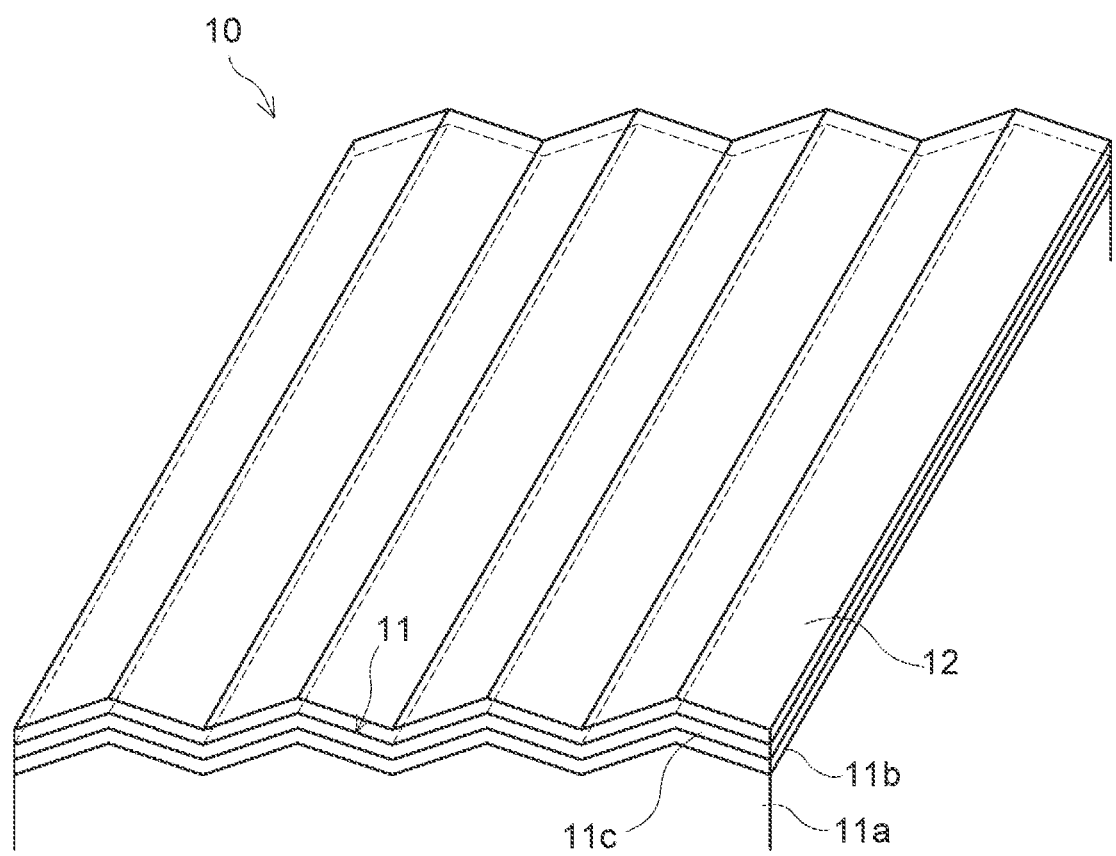
FIG. 4 is a perspective diagram schematically illustrating the actuator 10.

FIGS. 1 and 2 are schematic diagrams each illustrating an actuator 10. FIGS. 3 and 4 are perspective diagrams each schematically illustrating the actuator 10. Note that in FIGS. 3 and 4, illustration of, e.g., a power supply 50, a switch 52 and a control device 60 is omitted. FIGS. 1 and 3 each illustrate a state in which the switch 52 is off. FIGS. 2 and 4 each illustrate a state in which the switch 52 is on. As illustrated in FIGS. 1 and 2, the actuator 10 includes a base electrode 11, a counter electrode 12, a first terminal 31 connected to the base electrode 11 and a second terminal 32 connected to the counter electrode 12. In the form illustrated in FIGS. 1 and 2, at least a surface of the base electrode 11, the surface facing the counter electrode 12, has an uneven shape. Furthermore, at least a surface of the base electrode 11, the surface facing the counter electrode 12, is covered by an insulation layer 11c. The counter electrode 12 is disposed so as to face the base electrode 11. The counter electrode 12 is formed of a flexible conductor that is deformable via a Coulomb force generated upon application of a voltage between the base electrode 11 and the counter electrode 12. In the form illustrated in FIGS. 1 and 2, the counter electrode 12 is formed of a plate-like conductor having flexibility.

Base Electrode 11

As illustrated in FIGS. 1 and 2, the base electrode 11 includes a non-metal base material 11a, a conductive thin film 11b and the insulation layer 11c.

Non-Metal Base Material 11a

The non-metal base material 11a may be provided using, for example, ceramic or plastic. Where ceramic is provided, fired ceramic may be used. Also, where plastic is provided, plastic having a required stiffness may be used. Here, for a material used for the ceramic or the plastic as the non-metal base material 11a, a material ensuring a required mechanical strength for the base electrode 11 may be selected. Examples of such ceramic material include, e.g., silicon (Si), silicon carbide (SiC), aluminum nitride (AlN) and alumina ($Al_2O_3$). Also, for the plastic material used as the non-metal base material 11a, a thermosetting resin such as a phenol resin or an epoxy resin or a thermoplastic resin such as a polyamide resin, a polycarbonate resin or a polyethylene resin can be used. Also, the plastic material used as the non-metal base material 11a may be fiber-reinforced plastic containing, e.g., glass fiber or carbon fiber.

Conductive Thin Film 11b

The conductive thin film 11b is disposed on a side of the non-metal base material 11a, the side facing the counter electrode 12. The conductive thin film 11b may be, for example, a metal thin film formed of a highly conductive metal material. Examples of a material used for the metal thin film include, e.g., copper and aluminum. Also, for the metal thin film, platinum or gold, which is a material that is not easily oxidized, may be used. The metal thin film forming the conductive thin film 11b may be, for example, one formed on a side of the non-metal base material 11a, the side facing the counter electrode 12 by means of a film forming method such as sputtering or CVD (chemical vapor deposition). The first terminal 31 may be connected in such a manner that the first terminal 31 is electrically continuous with the conductive thin film 11b. Note that although as the conductive thin film 11b, a metal thin film is indicated as an example, the conductive thin film 11b is not limited to a metal thin film. The conductive thin film 11b may be a conductive sheet-like material. The conductive thin film 11b formed of a conductive sheet-like material may be fabricated using a later-described conductive gel.

Insulation Layer 11c

The insulation layer 11c is disposed on the conductive thin film 11b. The insulation layer 11c may be formed by, for example, a high dielectric ceramic thin film. Insulation between the base electrode 11 and the counter electrode 12 is reliably ensured by the insulation layer 11c. Also, charge accumulated in the base electrode 11 is reliably retained by the insulation layer 11c. From such perspectives, for the insulation layer 11c, a ferroelectric formed of ceramic can be used. The ferroelectric formed of ceramic may have, for example, a perovskite structure.

Examples of the ferroelectric having a perovskite structure include, e.g., barium titanate ($BaTiO_3$), lead titanate ($PbTiO_3$), lead zirconate titanate ($Pb(Zr, Ti)O_3$), lead lanthanum zirconate titanate ($(Pb, La)(Zr, Ti)O_3$), strontium titanate ($SrTiO_3$), barium strontium titanate ($(Ba, Sr) TiO_3$) and potassium sodium niobate ($(NaK)NbO_3$). Note that the material used for the insulation layer 11c is not limited to the examples indicated here. A material that is proper from the perspective of obtaining a large Coulomb force between the conductive thin film 11b of the base electrode 11 and the counter electrode 12 as described above can be employed. Also, the material may be a composite material containing a proper additive. For example, in the barium titanate, a substance such as $CaZrO_3$ or $BaSnO_3$ may be contained in a solid solution state.

Barium titanate is a representative ferroelectric material having a high relative permittivity of around 1000 to 10000. Lead zirconate titanate has a relative permittivity of 500 to 5000, and strontium titanate has a relative permittivity of 200 to 500. For the insulation layer 11c, a material having a high relative permittivity such as above can be employed. Note that the exemplary relative permittivities are indicated above, but a relative permittivity of a same material may vary depending on, e.g., a thickness, a crystal structure, precision of the crystal structure, a measurement condition (for example, a temperature) and/or a measurement device. The insulation layer 11c only needs to be one having required performance according to a predetermined usage environment of the actuator 10. Note that here, as a favorable example of the material used for the insulation layer 11c, a ferroelectric having a perovskite structure is indicated. Unless otherwise specifically noted, the material used for the insulation layer 11c is not limited to a ferroelectric having a perovskite structure. In this embodiment, the insulation layer 11c is formed of barium titanate. Here, the description has been provided taking the insulation layer 11c as an example. For insulation layers in other forms, also, any of the materials indicated as examples is appropriately used.

The insulation layer 11c has a required relative permittivity. The insulation layer 11c causes generation of a required Coulomb force between the base electrode 11 and the counter electrode 12 when a voltage is applied between the base electrode 11 and the counter electrode 12. The insulation layer 11c can have a relative permittivity of, for example, 1000 or more by means of employment of ceramic, for example, fine ceramic. For measurement of the relative permittivity indicated here as an example, for example, a Precision LCII, which is a ferroelectric measurement device of Radiant Technologies Inc. (U.S.A.), can be used. Also, the relative permittivity of the insulation layer 11c has a tendency of depending on, e.g., a temperature, a frequency of a current for measurement and/or a crystal structure of the material forming the insulation layer. The relative permittivity of the insulation layer 11c may be measured, for example, with room temperature of around 23° C. and a predetermined frequency of 100 to 1000 Hz. For the insulation layer 11c, one that exhibits a required relative permittivity under a predetermined usage environment of the actuator 10 can be used.

Here, in the base electrode 11, the non-metal base material 11a is used as a base material. For the insulation layer 11c, a ceramic thin film is employed. The ceramic thin film needs to be fired and is treated at a high temperature in the firing. Where a material having a heat resistance required for firing the ceramic thin film that is to form the insulation layer 11c is used for the non-metal base material 11a, the conductive thin film 11b may be formed on the non-metal base material 11a and particles of a material of the ceramic thin film that is to form the insulation layer 11c may be put on the conductive thin film 11b and be fired. However, where the non-metal base material 11a has no such required heat resistance, such method cannot be employed.

Where the non-metal base material 11a has no such required heat resistance, the conductive thin film 11b is formed on the non-metal base material 11a. For the insulation layer 11c, one formed separately from the non-metal base material 11a may be provided and disposed on the conductive thin film 11b. As a method for providing a ceramic thin film that is to form the insulation layer 11c separately, as disclosed in Japanese Patent Application Publication No. 2012-161957, a method for transferring a ceramic film subjected to high temperature treatment onto a base material having low heat resistance can be employed. For example, a polyimide film is formed on a support. A gel solution of a metal salt of barium titanate ($BaTiO_3$), which is representative for a ferroelectric, is provided on the polyimide film and is applied to the polyimide film formed on the support. Subsequently, the polyimide film formed on the support is heated to 500° C. or higher for firing. Consequently, a ceramic film of barium titanate ($BaTiO_3$) is formed on the polyimide film. Then, such ceramic film of barium titanate is transferred onto the conductive thin film 11b formed on the non-metal base material 11a. Here, a firing temperature of barium titanate is approximately 550° C. The polyimide used in fabrication of the ceramic film of barium titanate has a required heat resistance to the firing temperature of barium titanate. The polyimide used in fabrication of the ceramic film of barium titanate preferably has a heat resistance of, for example, approximately 600° C.

Such insulation layer 11c has required precision, and as the insulation layer 11c is thinner, an interelectrode distance between the conductive thin film 11b of the base electrode 11 and the counter electrode 12 is shorter. As the insulation layer 11c is thinner, a Coulomb force generated upon application of a voltage to the base electrode 11 and the counter electrode 12 is higher. Also, in the insulation layer 11c, it is more preferable that leakage of charge accumulated in the base electrode 11 upon application of a voltage to the base electrode 11 and to the counter electrode 12 be smaller. From the perspective of obtaining a large Coulomb force between the base electrode 11 and the counter electrode 12, it is preferable that the insulation layer 11c have small leak current (in other words, leakage of charge), have a high dielectric breakdown strength and thinly cover the conductive thin film 11b of the base electrode 11. From such perspective, the insulation layer 11c may be, for example, one obtained by a ceramic thin film being formed on a film having heat resistance such as a polyimide film, fired and then transferred onto the conductive thin film 11b. Note that the method for forming the insulation layer 11c is not limited to the above-described methods. For the method for forming the insulation layer 11c, a proper thin film forming method that causes less leak current (in other words, leakage of charge) and provides a high dielectric breakdown strength can appropriately be employed according to the material used for the insulation layer 11c.

Counter Electrode 12

The counter electrode 12 faces the base electrode 11 and is formed of a flexible conductor. More specifically, in this embodiment, as illustrated in FIG. 1, the counter electrode 12 faces the base electrode 11 via the insulation layer 11c. As illustrated in FIG. 2, in a state in which a voltage is applied between the base electrode 11 and the counter electrode 12, a Coulomb force acting between the base electrode 11 and the counter electrode 12 makes the counter electrode 12 deform so as to be attached to the base electrode 11. As illustrated in FIG. 1, in a state in which no voltage is applied between the base electrode 11 and the counter electrode 12, no Coulomb force acts. Therefore, the counter electrode 12 restores to its original shape. The counter electrode 12 has a required elastic force to restore to its original shape in a state in which no Coulomb force acts.

From such perspective, the counter electrode 12 can be formed of, for example, conductive rubber or conductive gel. In this embodiment, conductive rubber is employed for the counter electrode 12. The conductive rubber employed for the counter electrode 12 may be an elastomer shaped with a conductive material mixed therein. Here, examples of the conductive material include fine powder of carbon black, acetylene black or carbon nanotube, metal fine powder of silver or copper, and conductor fine powder having a core-shell structure in which an insulating body such as silica or alumina is coated with a metal via, e.g., sputtering. For the conductive gel, for example, a functional gel material in which, e.g., a solvent, an electrolyte and an additive such as water and a moisturizer are held in a three-dimensional polymer matrix can be employed. For such gel material, for example, ST-gel (registered trademark) of Sekisui Kasei Co., Ltd. can be employed.

Also, the counter electrode 12 may be formed by a leaf spring that is elastically deformable along the base electrode 11. For example, the counter electrode 12 may be a sheet-like thin leaf spring. In this case, the counter electrode 12 may be formed of a metal. In this way, for the counter electrode 12, a member having adequate flexibility may be employed. Also, the counter electrode 12 may be a viscoelastic body or an elasto-plastic body. In this case, for example, the counter electrode 12 can only be used in a region that can be regarded as an elastic region. Here, the description has been provided taking the counter electrode 12 as an example. For counter electrodes in the other forms, also, any of the materials indicated as examples is appropriately used.

In this way, the base electrode 11 of the actuator 10 includes the non-metal base material 11a, the conductive thin film 11b disposed on the side of the non-metal base material 11a, the side facing the counter electrode 12, and the insulation layer 11c disposed on the conductive thin film 11b. In the actuator 10, the base material of the base electrode 11 is formed of a non-metal material. Therefore, in comparison with a case where the entire base material is formed of a metal, the base electrode 11 is fabricated so as to be light in weight. The first terminal 31 connected to the power supply 50 is connected to the conductive thin film 11b of the base electrode 11. The second terminal 32 is connected to the counter electrode 12. The first terminal 31 and the second terminal 32 are connected to the power supply 50 through a wiring 51. The switch 52 is provided at the wiring 51. For the switch 52, for example, a switching element is used.

In a state in which the switch 52 is off, as illustrated in FIGS. 1 and 3, the counter electrode 12 is not attached to the facing surface of the base electrode 11 in its entirety. As illustrated in FIGS. 2 and 4, in a state in which the switch 52 is on, a Coulomb force acting between the base electrode 11 and the counter electrode 12 causes the counter electrode 12 to be attracted to the base electrode 11, deform so as to conform to the facing surface of the base electrode 11 and be attached to the base electrode 11. In a state in which the switch 52 is off, the Coulomb force vanishes, the counter electrode 12 restores to its original shape and the counter electrode 12 is detached from the base electrode 11. In this way, in the actuator 10 illustrated in FIGS. 1 and 2, in each of a state in which the switch 52 is on and a state in which the switch 52 is off, the counter electrode 12 changes its shape and the actuator 10 is driven according to the change. The switch 52 is turned on and off by the control device 60.

In the actuator 10, the counter electrode 12 deforms via a Coulomb force acting between the base electrode 11 and the counter electrode 12 upon application of a voltage to the first terminal 31 and the second terminal 32. The actuator 10 is driven along with the deformation of the counter electrode 12. The driving of the actuator 10 does not involve large compressive deformation of the insulation layer 11c, and thus, a large displacement can be obtained relative to the generated Coulomb force.

For the insulation layer 11c of the actuator 10, a ceramic thin film is used. Where a ceramic thin film is formed on a metal base material, cracking may occur in the ceramic thin film due to a difference in coefficient of thermal expansion during firing. In this embodiment, the insulation layer 11c of the actuator 10 is fabricated separately from the base material 11a and the conductive thin film 11b. Therefore, cracking is less likely to occur in the insulation layer 11c. Also, neither the base material 11a nor the conductive thin film 11b are affected by heat treatment in firing the insulation layer 11c. Therefore, there is flexibility in selection of materials used for the base material 11a and the conductive thin film 11b. For example, for the base material 11a, a material that melts at a temperature that is lower than a firing temperature of the insulation layer 11c, for example, plastic can be used.

Figure 5:
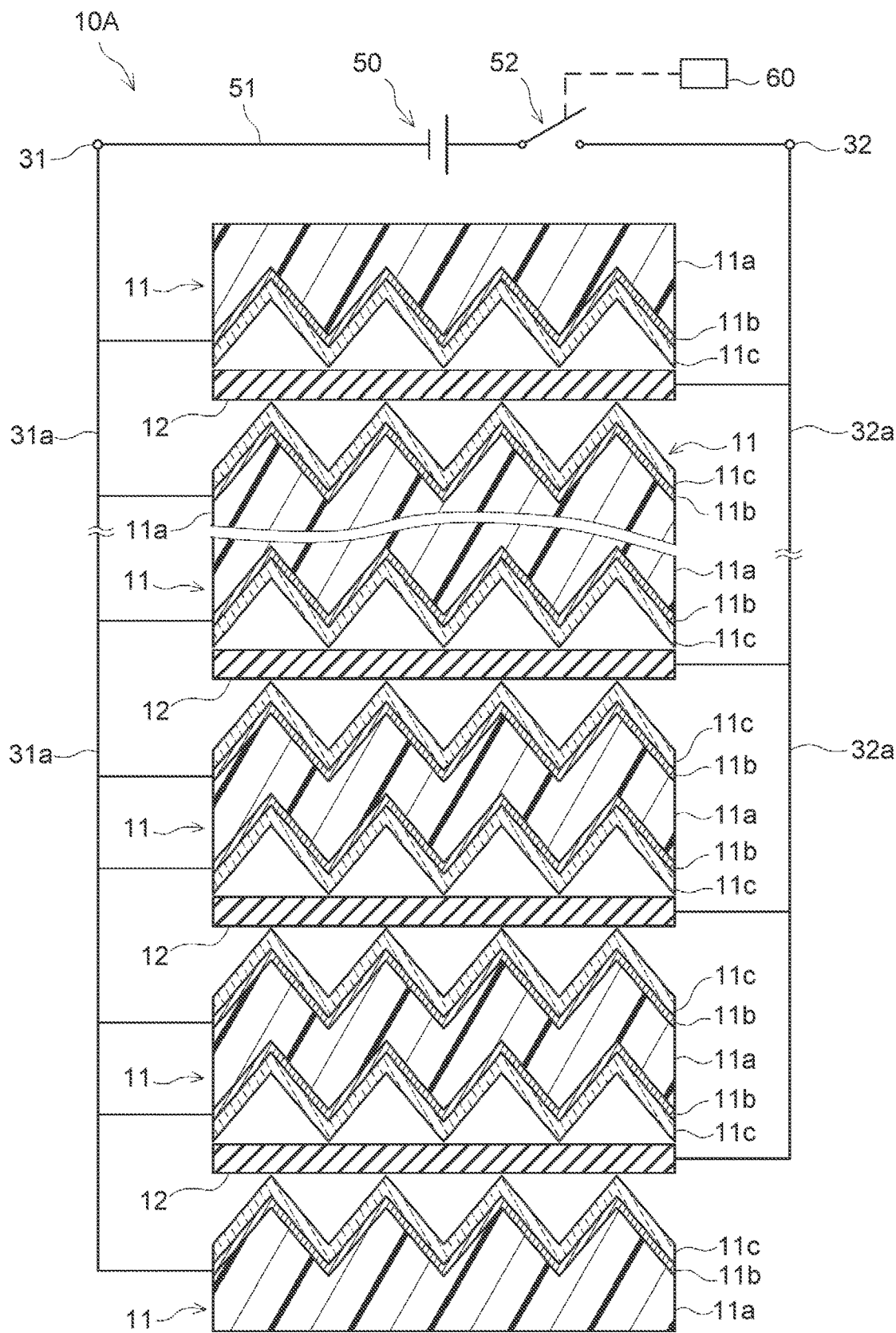
FIG. 5 is a schematic diagram illustrating an actuator 10A having another form.
Figure 6:
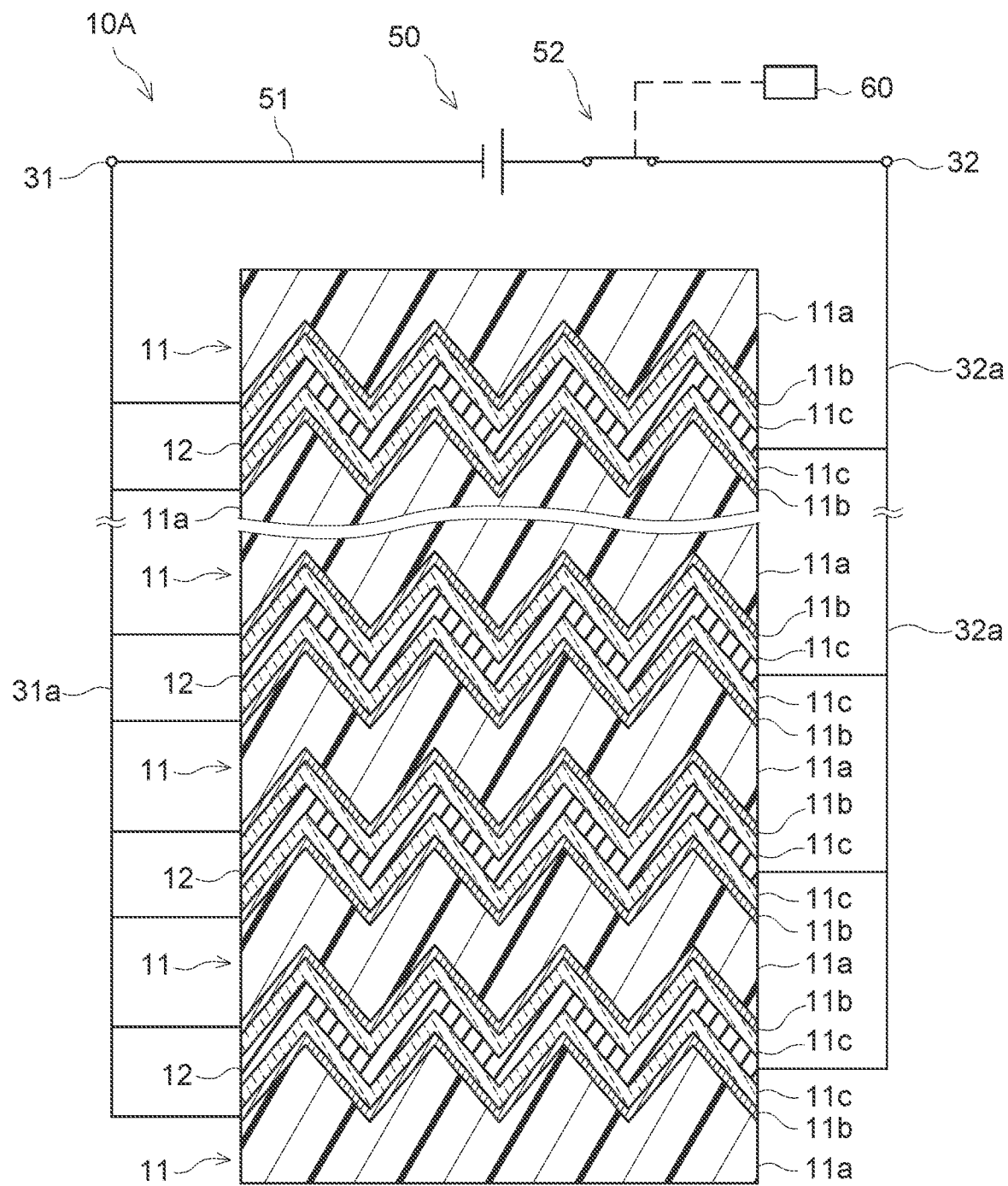
FIG. 6 is a schematic diagram illustrating the actuator 10A having another form.

FIGS. 5 and 6 are schematic diagrams each illustrating an actuator 10A having another form. FIG. 5 illustrates a state in which a switch 52 of the actuator 10A is off. FIG. 6 illustrates a state in which the switch 52 of the actuator 10A is on. As illustrated in FIGS. 5 and 6, in the actuator 10A, a plurality of base electrodes 11 are arranged so as to face one another in turn. Counter electrodes 12 are disposed between respective adjacent base electrodes 11 of the plurality of base electrodes 11. In this case, a surface of a base material 11a of each base electrode 11, the surface facing a counter electrode 12, is covered by a conductive thin film 11b and further covered by an insulation layer 11c. Then, a first wiring 31a connecting the plurality of base electrodes 11 in parallel is provided. Also, a second wiring 32a connecting the plurality of counter electrodes 12 in parallel is provided.

As illustrated in FIG. 6, in a state in which the switch 52 is on and a voltage is applied between the base electrodes 11 and the counter electrodes 12, respective Coulomb forces acting between the counter electrodes 12 and the base electrodes 11 cause the counter electrodes 12 to deform so as to be attached to the base electrode 11. As illustrated in FIG. 5, in a state in which the switch 52 is off and no voltage is applied between the base electrodes 11 and the counter electrodes 12, no Coulomb forces act. Therefore, the counter electrodes 12 restore to their original shape and distances between the base electrodes 11 increase.

In this embodiment, sides of the non-metal base materials 11a of the base electrodes 11, the sides facing the respective counter electrodes 12, have an uneven shape. Each conductive thin film 11b covers the uneven shape of the relevant non-metal base material 11a. Each insulation layer 11c further covers the relevant conductive thin film 11b. In a state in which the switch 52 is on, each counter electrode 12 deforms along the uneven shapes of the relevant base electrodes 11 and are attached to the base electrodes 11. Here, the uneven shapes of base electrodes 11 facing each other are shapes that fit each other. Therefore, in a state in which the switch 52 is on, upon the counter electrodes 12 deforming along the uneven shapes of the base electrodes 11 and being attached to the base electrodes 11, the uneven shapes of the base electrode 11 facing one another fit together and the respective distances between the base electrodes 11 decrease. Also, in a state in which the switch 52 is off and no voltage is applied between the base electrodes 11 and the counter electrodes 12, no Coulomb forces act. Therefore, the counter electrodes 12 restore to their original shape and the distances between the base electrodes 11 facing one another increase. Displacement of the base electrodes 11 facing one another here provides a displacement of the actuator 10.

Figure 7:
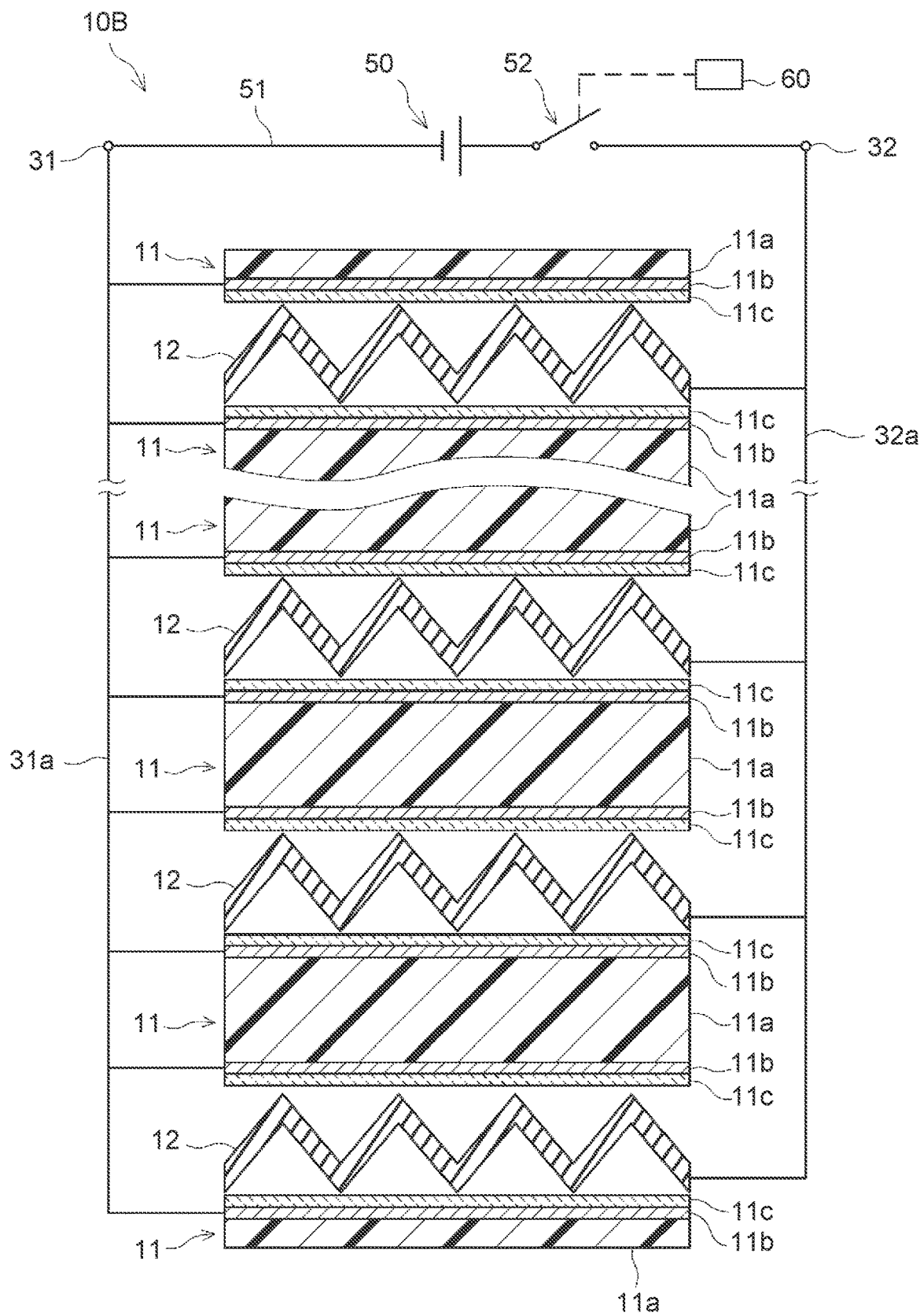
FIG. 7 is a schematic diagram illustrating an actuator 10B having another form.
Figure 8:
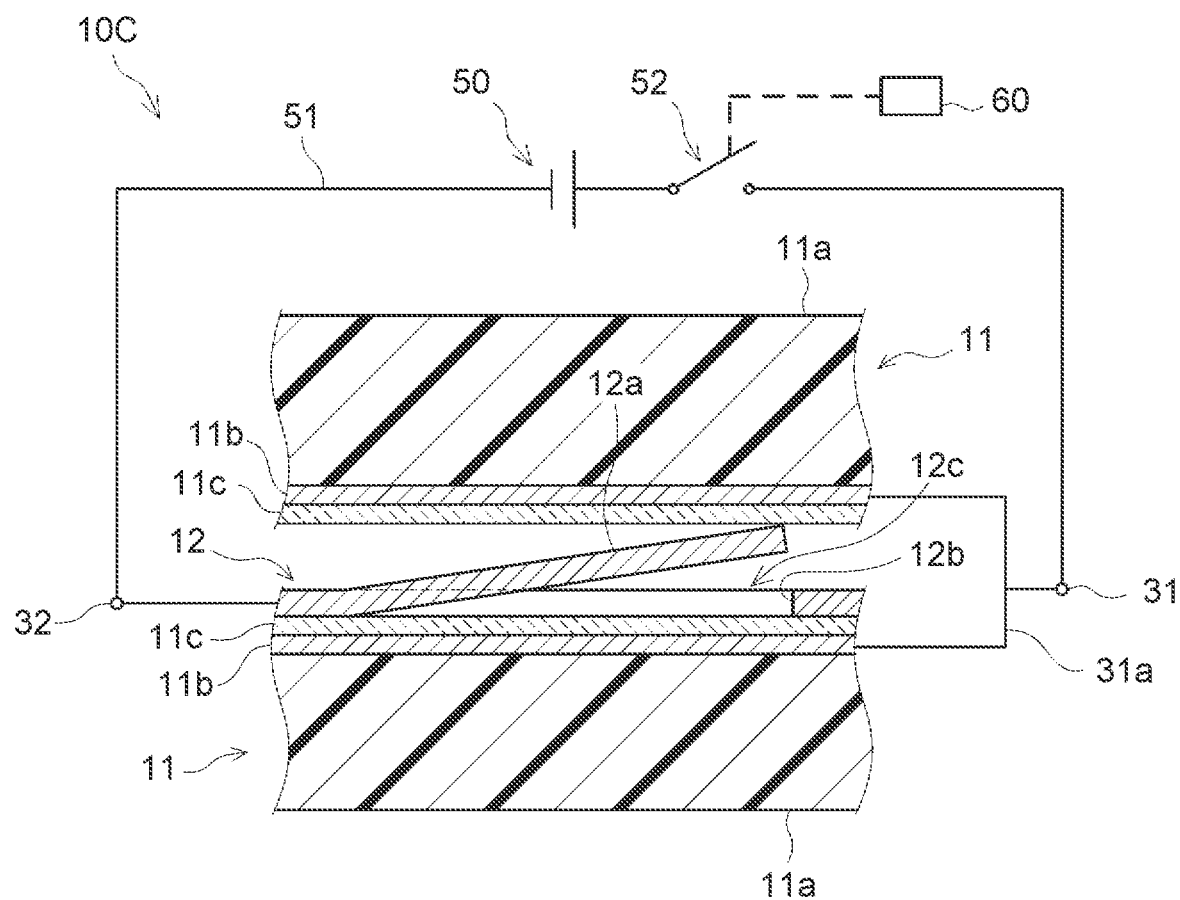
FIG. 8 is a schematic diagram of an actuator 10C having another form.

FIG. 7 is a schematic diagram illustrating an actuator 10B having another form. FIG. 8 is a schematic diagram illustrating an actuator 10C having another form. As illustrated in FIG. 7, counter electrodes 12 may have a corrugated plate-like shape. Also, as illustrated in FIG. 8, a counter electrode 12 of the actuator 10C may be a leaf spring. In this case, as illustrated in FIGS. 7 and 8, a surface of each base electrode 11, the surface facing the relevant counter electrode 12, may be flat. In this way, the shapes of the base electrodes 11 and the counter electrodes 12 can be changed variously.

For example, where each counter electrode 12 has a corrugated plate-like shape, as illustrated in FIG. 7, upon the switch 52 being turned off, a Coulomb force vanishes and the counter electrode 12 restores to the corrugated plate-like shape. As a result of restoration of the shape of the counter electrode 12, a distance between a relevant pair of base electrodes 11 increases. Upon the switch 52 being turned on, although illustration is omitted, a Coulomb force acts between the base electrodes 11 and the counter electrode 12. At this time, the counter electrode 12 deforms and the counter electrode 12 are attached to the base electrodes 11. Therefore, the distance between the base electrodes 11 decreases.

Also, as illustrated in FIG. 8, a counter electrode 12 may be a leaf spring. In this case, as illustrated in FIG. 8, the counter electrode 12 may include a bouncing-up part 12a. The bouncing-up part 12a is separated off by a slit 12b in the counter electrode 12 and can be received in a hole 12c formed by the slit 12b. In this case, upon the switch 52 being turned off, a Coulomb force vanishes and the counter electrode 12 restores to its original shape, and a distance between the base electrodes 11 sandwiching the counter electrode 12 is increased by the bouncing-up part 12a. On the other hand, upon the switch 52 being turned on, although illustration is omitted, Coulomb forces act between the base electrodes 11 and the counter electrode 12. At this time, the counter electrode 12 deforms and the counter electrode 12 is attached to the base electrodes 11. Therefore, the distance between the base electrodes 11 decreases. At this time, the bouncing-up part 12a is received in the hole 12c formed by the slit 12b. The deformation of the counter electrode 12 decreases the distance between the base electrodes 11 sandwiching the counter electrode 12. Also, upon the switch 52 being turned off, the Coulomb forces vanish and the counter electrode 12 restores to its original shape. Upon the restoration of the counter electrode 12, as illustrated in FIG. 8, the bouncing-up part 12a bounces up and the distance between the base electrodes 11 sandwiching the counter electrode 12 increases.

In this way, the shapes of the counter electrodes 12 and the base electrodes 11 can be changed variously. In any case, the actuator 10 can output a change in distance between the base electrodes 11 as a displacement. The actuator 10 is less likely to be subject to limitation due to compressive deformation of insulation layers 11c and can obtain a large displacement. In this case, also, the base electrodes 11 each include a non-metal base material 11a, a conductive thin film 11b disposed on a side of the non-metal base material 11a, the side facing a relevant counter electrode 12, and an insulation layer 11c disposed on the conductive thin film 11b.

Next, another form of structure of the base electrode 11 will be described.

Figure 9:
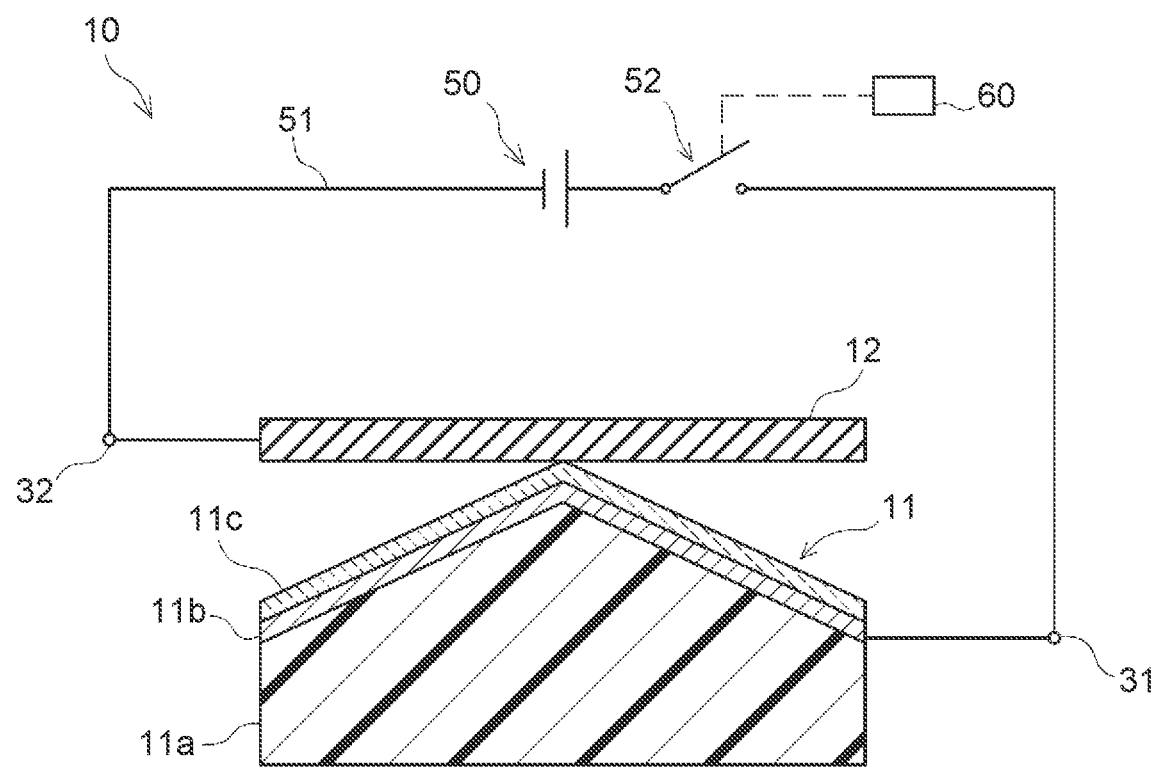
FIG. 9 is a schematic diagram of an actuator 10.
Figure 10:
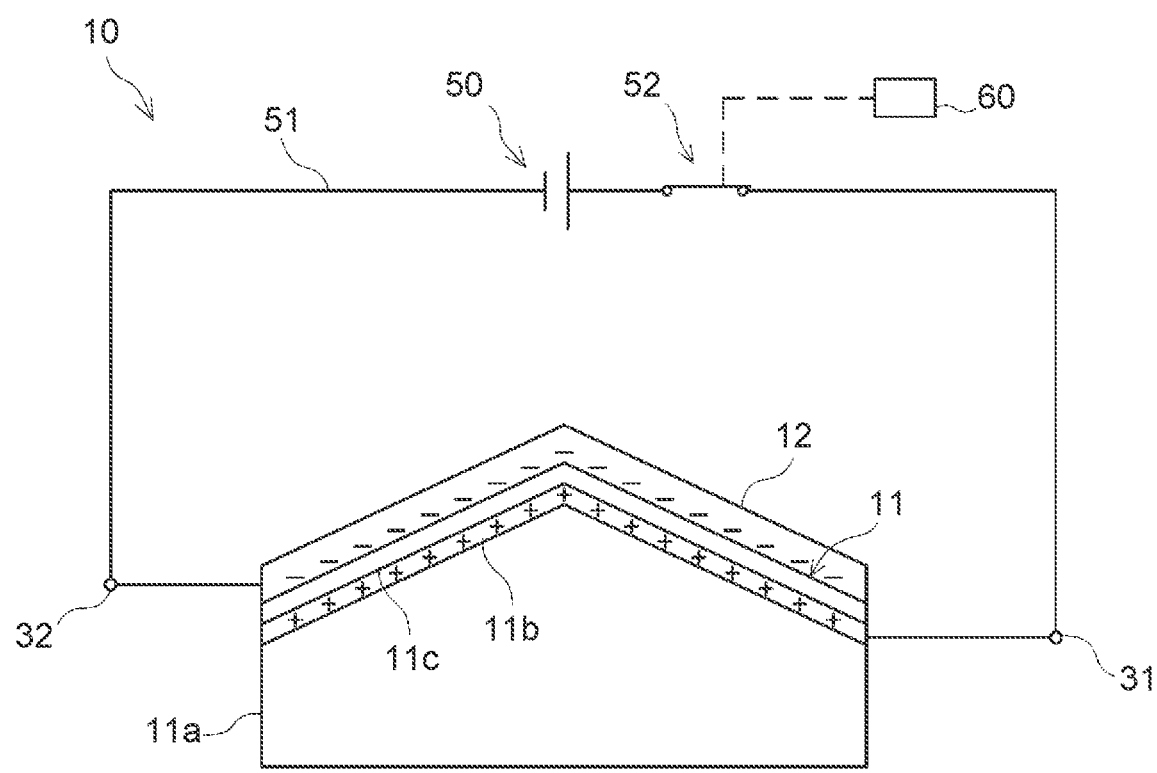
FIG. 10 is a schematic diagram of the actuator 10.

Here, each of FIGS. 9 and 10 is a schematic diagram of an actuator 10. In FIGS. 9 and 10, the actuator 10 is illustrated in a more simplified manner. FIG. 9 illustrates a state in which a switch 52 of the actuator 10A is off. FIG. 10 illustrates a state in which the switch 52 of the actuator 10A is on. Note that each of FIGS. 9 and 10 is a schematic diagram of an actuator 10 and does not necessarily illustrates an actual actuator. Another form of, particularly, the base electrode 11 of the actuator 10 will be described below with reference to FIGS. 9 and 10.

For example, for a base material 11a of a base electrode 11 of an actuator 10, a conductive metal material may be used. In this case, no conductive thin film 11b may be provided and an insulation layer 11c may be provided on the base material 11a. However, firing a ceramic thin film that is to form an insulation layer 11c on a metal base material 11a may cause cracking in the insulation layer 11c. There is a large difference in coefficient of thermal expansion between the metal used in the base material 11a and the ceramic used in the insulation layer 11c. For example, a coefficient of thermal expansion of barium titanate is approximately $5 \times 10^{-6}$/K. A coefficient of thermal expansion of copper is approximately $16.8 \times 10^{-6}$/K. A coefficient of thermal expansion of aluminum is approximately $23 \times 10^{-6}$/K. A coefficient of thermal expansion of stainless steel (SUS410) is approximately $10.4 \times 10^{-6}$/K. Each of the coefficients of thermal expansion indicated here is a coefficient of linear thermal expansion. The base material 11a formed of metal and the insulation layer 11c formed of ceramic are largely different from each other in coefficient of thermal expansion. Because of the difference in coefficient of thermal expansion, the insulation layer 11c formed of a ceramic thin film having a small coefficient of thermal expansion cannot follow expansion of the metal base material 11a during firing. Therefore, cracking may occur in the insulation layer 11c formed of a ceramic thin film.

In order to prevent such cracking, for the base material 11a of the base electrode 11, for example, a material having a coefficient of thermal expansion that is substantially equal to that of the ceramic used in the insulation layer 11c may be used. For example, the base material 11a of the base electrode 11 may be provided in the form of a compact obtained by shaping raw power of ceramic before firing. A metal thin film is formed on the base material 11a as the conductive thin film 11b. Next, powder of high dielectric ceramic that is to form the insulation layer 11c is spread over the metal thin film that is to form the conductive thin film 11b, so as to have a predetermined thickness. The high dielectric ceramic that is to form the insulation layer 11c may be applied onto the metal thin film that is to form the conductive thin film 11b, so as to have a predetermined thickness in a gel form. Here, for the base material 11a and the insulation layer 11c, respective materials that are substantially equal to each other in coefficient of thermal expansion may be used. Where respective materials that are substantially equal to each other in coefficient of thermal expansion are used for the base material 11a and the insulation layer 11c, when the insulation layer 11c is fired, cracking due to heat treatment in the firing is less likely to occur in the insulation layer 11c.

For example, where barium titanate is used for the insulation layer 11c, e.g., silicon (Si), silicon carbide (SiC) or aluminum nitride (AlN) is preferably used for the base material 11a. Here, a coefficient of thermal expansion of barium titanate is approximately $5\times10^{-6}$/K. A coefficient of thermal expansion of silicon (Si) is approximately $3.9\times10^{-6}$/K. A coefficient of thermal expansion of silicon carbide (SiC) is approximately $4.4\times10^{-6}$/K. A coefficient of thermal expansion of aluminum nitride (AlN) is approximately $4.6\times10^{-6}$/K. These substances each enable curbing a difference in coefficient of thermal expansion between barium titanate and the substance to be small in comparison with a case where metal is used for the base material 11a. In this way, where barium titanate is used for the insulation layer 11c, e.g., silicon (Si), silicon carbide (SiC) or aluminum nitride (AlN) may be selected for the base material 11a. In this way, where barium titanate is used for the insulation layer 11c, a material having a coefficient of linear thermal expansion of preferably no less than $3\times10^{-6}$/K, more preferably no less than $3.5\times10^{-6}$/K but preferably no more than $7\times10^{-6}$/K, more preferably no more than $6.5\times10^{-6}$/K is desirably selected for the base material 11a.

In this way, a ceramic material may be used for the base material 11a. In this case, a smaller difference in coefficient of thermal expansion between that ceramic material and the ceramic material used for the insulation layer 11c is better. Also, a metal thin film is preferably employed for the conductive thin film 11b disposed on the base material 11a. In particular, a material that is not easily oxidized by heat treatment in firing is preferably selected. From such perspective, platinum or gold is preferably used for the conductive thin film 11b. Since platinum and gold are not easily oxidized, platinum and gold is less likely to take oxygen atoms away from the barium titanate used as the insulation layer 11c, during firing. Therefore, during firing, platinum and gold are less likely to degrade a crystal structure of the barium titanate.

According to the present inventor's findings, for example, when a platinum thin film having a thickness of 150 to 200 nm was formed as a conductive thin film on a base material of silicon (Si), and next, an insulation layer of barium titanate was formed so as to have a thickness of 150 to 200 nm and then fired, none of cracking, detachment and the like was observed in the insulation layer formed of barium titanate. Such structure may be applied to the base electrode 11 of the actuator 10.

Also, the insulation layer 11c may be provided using a non-woven fabric of ceramic and be fired. For example, a ceramic thin film that is to form the insulation layer 11c may be formed on the metal base material 11a. In other words, a non-woven fabric of ceramic may be disposed on the metal base material 11a as the insulation layer 11c without the conductive thin film 11b being disposed, and be fired. In this case, since the insulation layer 11c is provided in the form of a non-woven fabric, the insulation layer 11c has a form of fiber and thus is movable to a certain extent. Therefore, cracking due to heat treatment in firing is less likely to occur in the insulation layer 11c. Note that a non-woven fabric of ceramic has required precision for the insulation layer 11c and a smaller thickness of the non-woven fabric is better. Examples of a method for obtaining such ceramic non-woven fabric include electrospinning. Employment of electrospinning enables obtaining a thin and precise non-woven fabric sheet formed of thin ceramic material fiber.

Furthermore, as another form of base electrode 11, a ceramic thin film that is to form an insulation layer 11c may be fabricated separately from a base material 11a and a conductive thin film 11b and fired, and then be disposed on the base material 11a or the conductive thin film 11b. In this case, since the insulation layer 11c is fabricated separately from the base material 11a and the conductive thin film 11b, cracking is less likely to occur in the insulation layer 11c in heat treatment in firing the insulation layer 11c. For example, the ceramic thin film that is to form the insulation layer 11c may be disposed on the metal base material 11a after being fired. In other words, a fired ceramic thin film may be disposed on the metal base material 11a as an insulation layer 11c without the conductive thin film 11b being disposed.

Also, the ceramic thin film that is to form the insulation layer 11c being fabricated separately from the base material 11a and the conductive thin film 11b enables using a non-metal base material 11a of non-metal such as plastic for the base material 11a. In this case, the weight can be reduced in comparison with a case where a metal material is used for the base material 11a as long as the non-metal base material and the metal material have a same shape. In this case, the insulation layer 11c of the base electrode 11 may be formed of a fired ceramic non-woven fabric.

The ceramic non-woven fabric may be fabricated on, for example, polyimide having a necessary heat resistance to the firing temperature of barium titanate. Then, a ceramic non-woven fabric may be fabricated on polyimide and be fired as it is on the polyimide. Also, a shape of the polyimide on which the ceramic non-woven fabric is fabricated may be determined in advance so as to conform a shape of the base material 11a or the conductive thin film 11b on which the insulation layer 11c is to be disposed. Consequently, a ceramic non-woven fabric conforming to the shape of the base material 11a or the conductive thin film 11b on which the insulation layer 11c is disposed can be obtained in a fired state.

In this way, a fired ceramic thin film may be provided as an insulation layer 11c separately from a base material 11a and a conductive thin film 11b. The fired ceramic thin film is disposed on the base material 11a or the conductive thin film 11b as the insulation layer 11c. At this time, a fine gap is generated between the base material 11a or the conductive thin film 11b and the fired ceramic thin film, which is the insulation layer 11c. The gap can be generated irrespective of whether or not the ceramic thin film has a form of a non-woven fabric. Air enters the gap, causing a decrease in relative permittivity between the base material 11a or the conductive thin film 11b and a counter electrode 12.

Therefore, a conductive paste or a conductive gel may be disposed between a base material 11a or a conductive thin film 11b on which an insulation layer 11c is disposed and the insulation layer 11c. In this case, a gap between the base material 11a or the conductive thin film 11b on which the insulation layer 11c is disposed and the insulation layer 11c is filled by the conductive paste or the conductive gel.

Therefore, no air enters the gap. Therefore, a significant decrease in relative permittivity between the base electrode 11 and a counter electrode 12 is prevented, enabling the actuator 10 to have stable performance.

The conductive paste or the conductive gel has a form that enables filling the gap between the base material 11a or the conductive thin film 11b on which the insulation layer 11c is disposed and the insulation layer 11c. Examples of a conductive material for the conductive paste or the conductive gel include fine powder of carbon black, acetylene black or carbon nanotube, metal fine powder of silver or copper, and conductor fine powder having a core-shell structure in which an insulating body such as silica or alumina is coated with a metal via, e.g., sputtering. The conductive paste can be provided by dispersing particles of a conductive material in a solvent of a binder resin such as a polymer. For the paste solvent, a proper solvent having a required viscosity can be employed. For the conductive gel, for example, a functional gel material in which, e.g., a solvent, an electrolyte and an additive such as water and a moisturizer are held in a three-dimensional polymer matrix can be employed. For such gel material, for example, ST-gel (registered trademark) of Sekisui Kasei Co., Ltd. can be employed.

Note that the conductive paste or the conductive gel may be applied onto the base material 11a or the conductive thin film 11b on which the insulation layer 11c is to be disposed, so as to have a predetermined thickness. Then, the insulation layer 11c formed of a fired ceramic thin film may be transferred onto the conductive paste or the conductive gel. The conductive paste or the conductive gel may be cured in a state of filling a gap between the base material 11a and the conductive thin film 11b on which the insulation layer 11c is disposed and the insulation layer 11c. In other words, a cured conductive material may be disposed between the base material 11a or the conductive thin film 11b and the insulation layer 11c. Here, as described above, the fired ceramic thin film to be used as the insulation layer 11c may be shaped on a film of polyimide. Consequently, air is less likely to enter between the base material 11a or the conductive thin film 11b on which the insulation layer 11c is disposed and the insulation layer 11c, preventing a significant decrease in relative permittivity between the base electrode 11 and the counter electrode 12 and thus enabling the actuator 10 to have stable performance.

Also, a method of manufacturing the actuator 10 proposed here includes, for example, a step of preparing a non-metal base material 11a formed in a predetermined shape as described above, a step of disposing a conductive thin film 11b on a surface in a predetermined area of the non-metal base material 11a, and a step of disposing an insulation layer 11c on the conductive thin film 11b (see FIG. 9).

The insulation layer 11c may be provided using a ceramic thin film. In this case, in the step of disposing an insulation layer 11c on the conductive thin film 11b, the ceramic thin film may be disposed on the conductive thin film 11b. Also, the ceramic thin film forming the insulation layer 11c may be a non-woven fabric. Also, the ceramic thin film may be disposed on the conductive thin film 11b in a state in which a conductive paste or a conductive gel is applied to at least one of the conductive thin film 11b and the ceramic thin film forming the insulation layer 11c. Then, the method of manufacturing the actuator 10 may include a step of curing the conductive paste or the conductive gel. Note that where the ceramic thin film has a form of a non-woven fabric, the conductive paste or the conductive gel is applied thinly to the extent that the conductive paste or the conductive gel is not electrically continuous with the counter electrode 12.

Also, the conductive paste or the conductive gel has a required viscosity to the extent that the conductive paste or the conductive gel is prevented from excessively permeating the ceramic thin film having a form of a non-woven fabric.

As described above, in the actuator disclosed here, in a state in which the switch 52 is on, a Coulomb force acts between the conductive thin film 11b of the base electrode 11 and the counter electrode 12 via the insulation layer 11c. The Coulomb force causes the counter electrode 12 to be attracted to the conductive thin film 11b of the base electrode 11, deform so as to conform to the base electrode 11 and be attached to the base electrode 11 (see FIG. 2). In a state in which the switch 52 is off, the Coulomb force vanishes, the counter electrode 12 restores to its original shape and the counter electrode 12 is detached from the base electrode 11 (see FIG. 1). When the switch 52 is brought into an off state from an on state, if a Coulomb force promptly vanishes, the counter electrode 12 promptly restores to its original shape and the counter electrode 12 is promptly detached from the base electrode 11, which results in enhancement in response speed.

Actuator 10D

Figure 11:
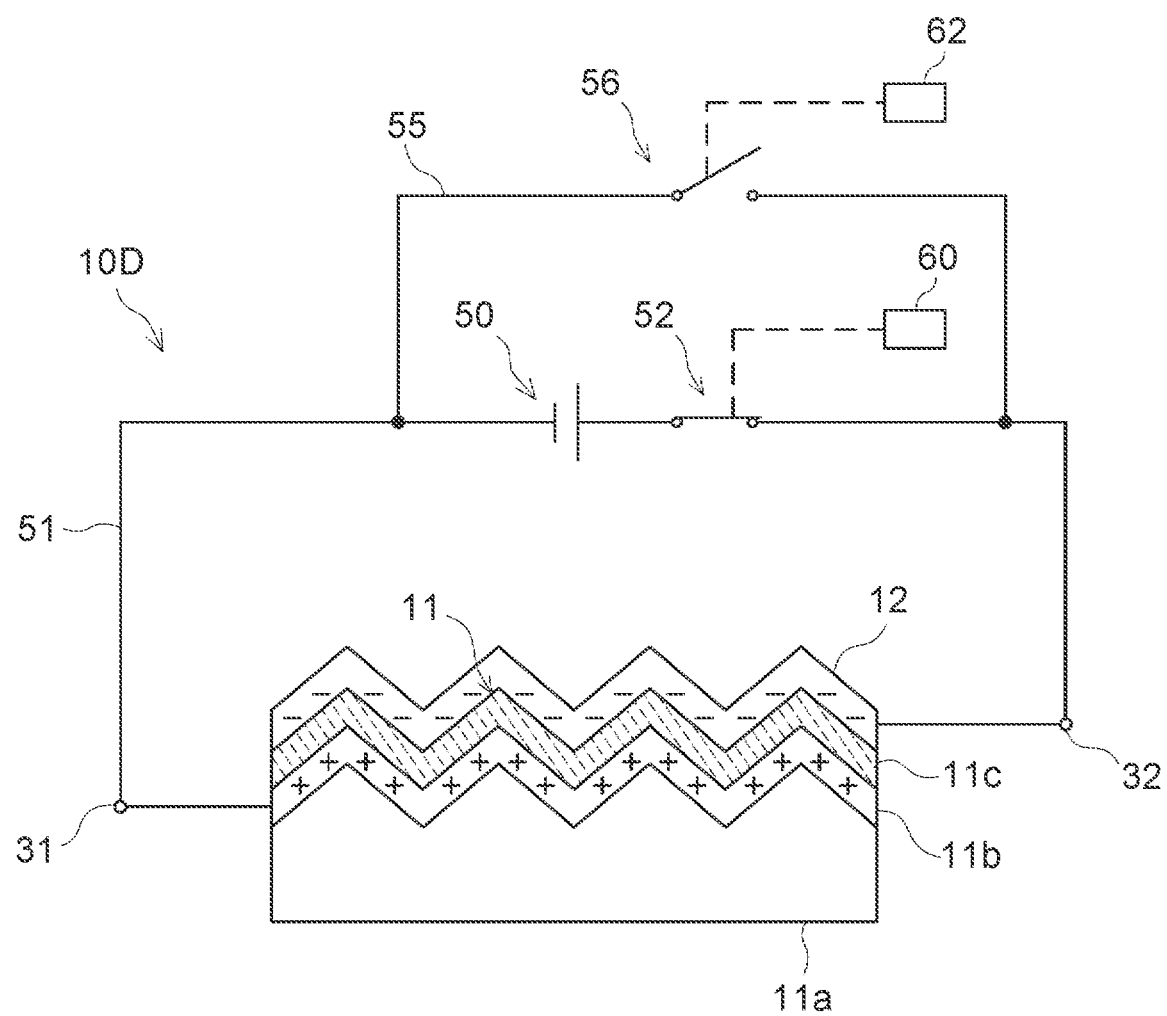
FIG. 11 is a sectional view schematically illustrating an actuator 10D according to another embodiment.
Figure 12:
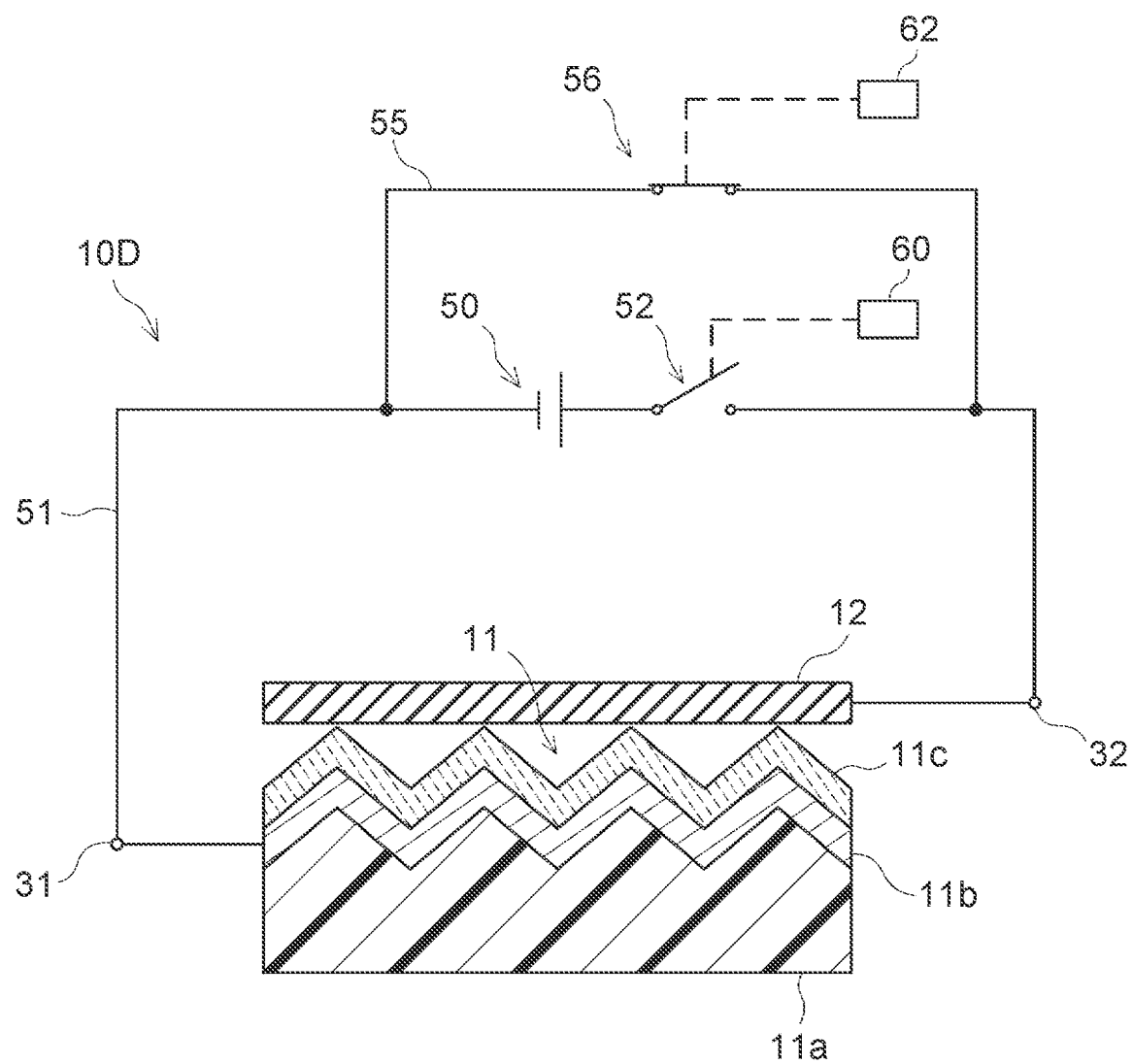
FIG. 12 is a sectional view schematically illustrating the actuator 10D according to the other embodiment.

From the perspective of enhancement in response speed, it is desirable that when the switch 52 is brought into an off from an on state, a Coulomb force promptly vanish. Here, another modification will be described taking the form illustrated in FIGS. 1 and 2 as an example. The form of the actuator illustrated in the modification is not limited to the form illustrated in FIGS. 1 and 2 but is applicable to various forms. FIGS. 11 and 12 are sectional views schematically illustrating an actuator 10D according to another embodiment. In the actuator 10D illustrated in FIGS. 11 and 12, members and parts that act in a manner that is the same as those of the actuator 10 illustrated FIG. 1 are provided with reference numerals that are the same as those of the actuator 10 illustrated FIG. 1, and overlapping description thereof will appropriately be omitted. FIG. 11 illustrates a state in which a first switch 52 of the actuator 10D is on, in other words, a state in which a base electrode 11 and a counter electrode 12 are attached to each other. FIG. 12 illustrates a state in which the first switch 52 of the actuator 10D is off, in other words, a state in which the base electrode 11 and the counter electrode 12 are detached from each other.

The actuator 10D illustrated in FIGS. 11 and 12 includes the base electrode 11, the counter electrode 12, a power supply 50, a first switch 52, a connection wiring 55, a second switch 56, a first control device 60 and a second control device 62.

The power supply 50 is a device that applies a voltage to a conductive thin film 11b of the base electrode 11 and to the counter electrode 12. The first switch 52 is a switch that switches between connection and disconnection between the conductive thin film 11b and the counter electrode 12, and the power supply 50. In this embodiment, the power supply 50 and the first switch 52 are each provided at a wiring 51. The wiring 51 is a wiring for connecting a first terminal 31 connected to the conductive thin film 11b of the base electrode 11 and a second terminal 32 connected to the counter electrode 12 to the power supply 50. The first control device 60 is a control device that operates connection and disconnection of the first switch 52.

The connection wiring 55 is a wiring that electrically connects the base electrode 11 and the counter electrode 12 with the power supply 50 not interposed therebetween. In this embodiment, as illustrated in FIGS. 11 and 12, the connection wiring 55 is provided in such a manner that the connection wiring 55 branches from the wiring 51 that connects the first terminal 31 connected to the conductive thin film 11b and the second terminal 32 connected to the counter electrode 12 to the power supply 50, so as to bypass the power supply 50. Note that the connection wiring 55 may be provided so as to connect the first terminal 31 connected to the conductive thin film 11b and the second terminal 32 connected to the counter electrode 12 separately from the wiring 51. Also, the connection wiring 55 may be provided so as to connect the conductive thin film 11b and the counter electrode 12 with one or both of the first terminal 31 and the second terminal 32 not interposed therebetween.

The second switch 56 is provided at the connection wiring 55. The second switch 56 is a switch that switches between a state in which the conductive thin film 11b and the counter electrode 12 are electrically connected via the connection wiring 55 and a state in which the connection wiring 55 is disconnected. The second control device 62 is a device that operates opening and closing of the second switch 56.

As illustrated in FIG. 11, the first control device 60 and the second control device 62 are configured such that when the first switch 52 is closed, the second switch 56 is open. Furthermore, as illustrated in FIG. 12, the first control device 60 and the second control device 62 are configured such that when the first switch 52 is open, the second switch 56 is closed.

In the actuator 10D, upon the first switch 52 being closed, a voltage is applied to the conductive thin film 11b and the counter electrode 12, whereby the base electrode 11 and the counter electrode 12 are attached to each other. Upon the first switch 52 being opened, the voltage applied to the conductive thin film 11b and the counter electrode 12 vanishes, and furthermore, upon the Coulomb force vanishing, the base electrode 11 and the counter electrode 12 are detached from each other.

In the actuator 10D, in a state in which the first switch 52 is on, as illustrated in FIG. 11, the conductive thin film 11b and the counter electrode 12 are each electrically charged, and a Coulomb force is generated between the conductive thin film 11b and the counter electrode 12. Then, when the first switch 52 is brought into an open state (off state) from a closed state (on state), as illustrated in FIG. 12, the second switch 56 is closed and the conductive thin film 11b and the counter electrode 12 are thereby electrically connected. Upon the conductive thin film 11b and the counter electrode 12 being electrically connected, electrical charge in the conductive thin film 11b and electrical charge in the counter electrode 12 are promptly eliminated. Therefore, the Coulomb force acting between the conductive thin film 11b and the counter electrode 12 is promptly eliminated, the counter electrode 12 promptly restores to its original shape and the counter electrode 12 is promptly detached from the base electrode 11. In this way, provision of the second switch 56 increases a response speed in the base electrode 11 and the counter electrode 12 being detached from each other when the first switch 52 is brought into an open state (off state) from a closed state (on state).

The actuator 10D includes the control devices 60, 62 configured such that when the first switch 52 is closed, the second switch 56 is open and when the first switch 52 is open, the second switch 56 is closed. In the form illustrated in FIGS. 11 and 12, the actuator 10D is configured such that the first switch 52 is electrically operated by the first control device 60. Also, the actuator 10D is configured such that the second switch 56 is electrically operated by the second control device 62. Therefore, the first switch 52 and the second switch 56 are electrically operated promptly and furthermore are timed to each other. Here, the first control device 60 and the second control device 62 may be provided by separate control devices or may be provided by a single control device. The first control device 60 and the second control device 62 can be provided, by, for example, a single microcomputer.

Here, each of the control devices can be a device that performs various electric processing for an apparatus including the actuator. Each of the control devices can be embodied by a computer that is driven according to a predetermined program. More specifically, functions of each of the control devices may be processed by an arithmetic device (also referred to as a processor, a CPU (central processing unit) or an MPU (micro-processing unit)) and a storage device (e.g., a memory or a hard disk) of a computer forming the relevant control device. For example, components of each of the control devices can be embodied by, e.g., a database that stores data in a predetermined format, a data structure and a processing module that performs predetermined arithmetic processing according to a predetermined program, which are embodied by a computer, or parts thereof. Also, although illustrated is omitted, each of the control devices may be one in which a plurality of control devices operate in coordination. For example, each of the control devices may be connected to another computer through, e.g., a LAN cable, a wireless channel or the Internet in such a manner as to be capable of performing data communication with the other computer. The processing in each of the control devices may be performed in coordination with such other computer. For example, information stored in the control devices or a part of the information may be stored in an external computer and processing performed by the control devices or a part of the processing may be performed by an external computer.

Actuator 10E

Figure 13:
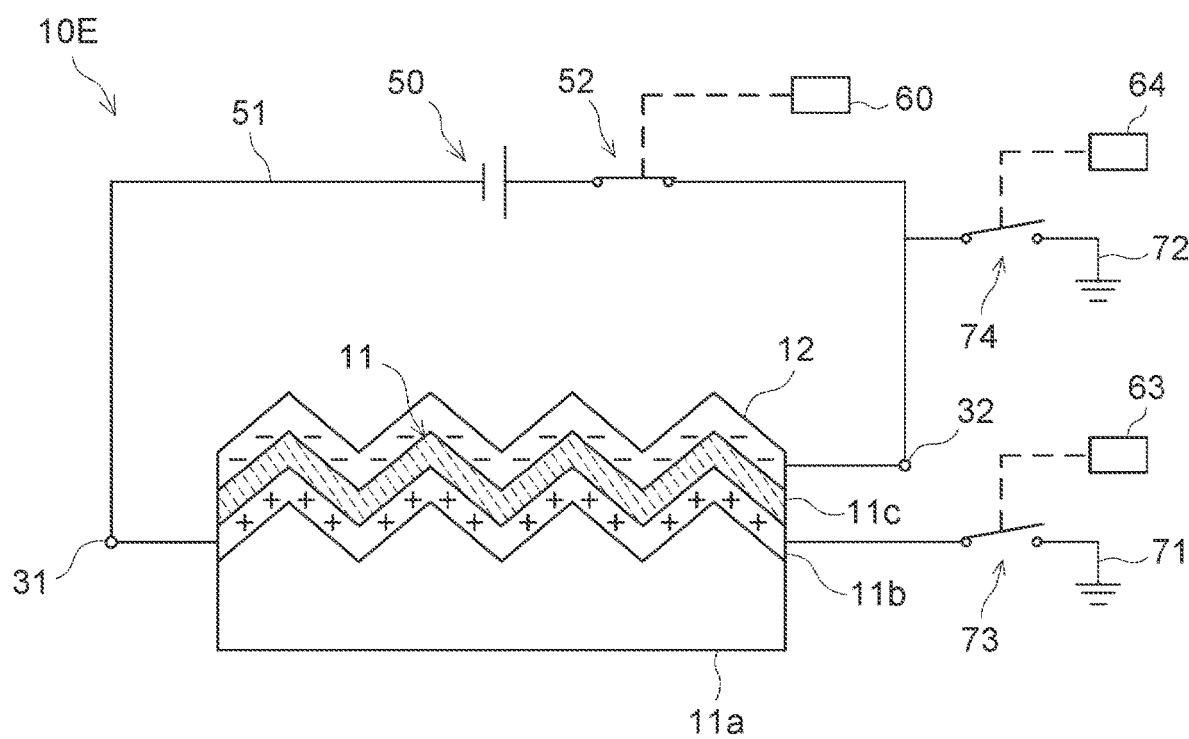
FIG. 13 is a sectional view schematically illustrating an actuator 10E according to another embodiment.
Figure 14:
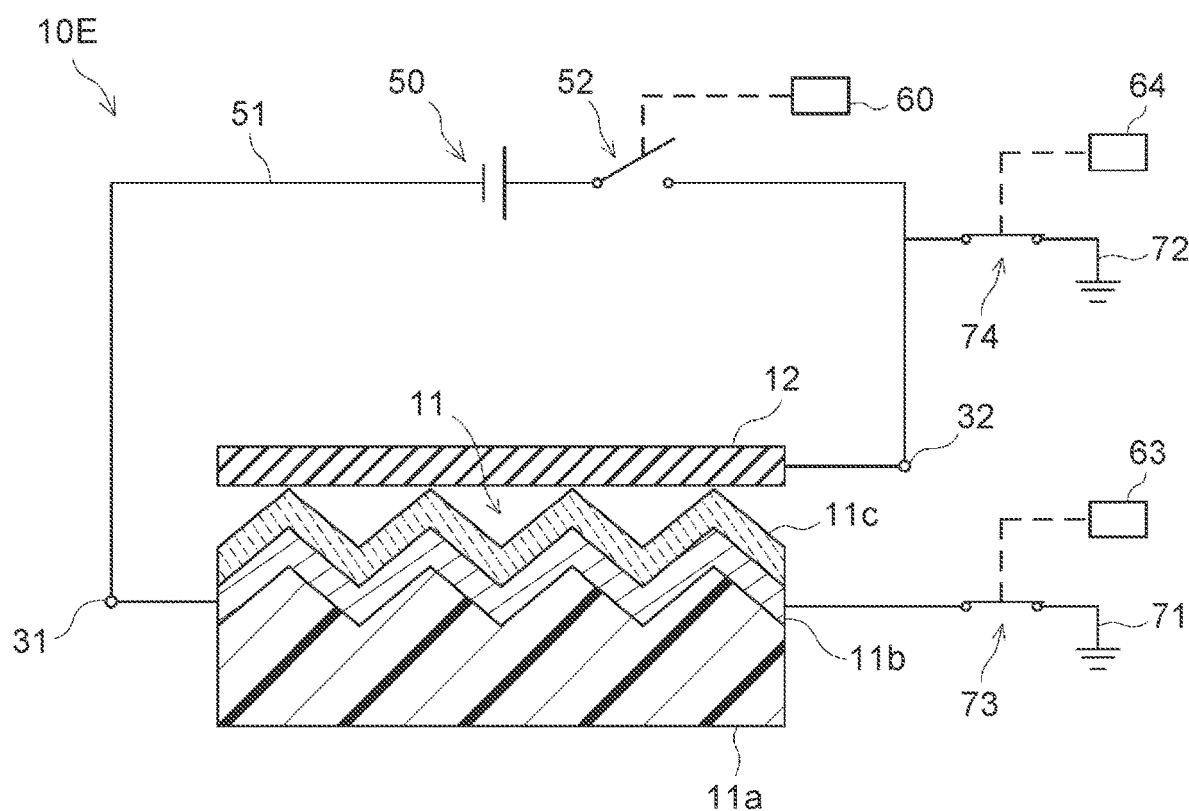
FIG. 14 is a sectional view schematically illustrating the actuator 10E according to the other embodiment.

FIGS. 13 and 14 are sectional views each schematically illustrating an actuator 10E according to another embodiment. In the actuator 10E illustrated in FIGS. 13 and 14, members and parts that act in a manner that is the same as those of the actuator 10 illustrated FIG. 1 are provided with reference numerals that are the same as those of the actuator 10 illustrated FIG. 1, and overlapping description thereof will appropriately be omitted. FIG. 13 illustrates a state in which a switch of the actuator 10E is on. FIG. 14 illustrates a state in which the switch of the actuator 10E is off.

The actuator 10E illustrated in FIGS. 13 and 14 includes a third control device 63, a fourth control device 64, a first grounding wire 71, a second grounding wire 72, a third switch 73 and a fourth switch 74. The actuator 10E also includes a first switch 52 and a first control device 60 that have been described above.

The first grounding wire 71 is an electric wiring that grounds a conductive thin film 11b. The third switch 73 is provided at the first grounding wire 71 and is a switch that switches between connection and disconnection of the first grounding wire 71. The third control device 63 is a device that operates the third switch 73 to control grounding of the conductive thin film 11b.

The second grounding wire 72 is an electric wiring that grounds a counter electrode 12. The fourth switch 74 is provided at the second grounding wire 72 and is a switch that switches between connection and disconnection of the second grounding wire 72. The fourth control device 64 is a device that operates the fourth switch 74 to control grounding of the counter electrode 12.

The first control device 60, the third control device 63 and the fourth control device 64 are configured such that when the first switch 52 is closed, the third switch 73 and the fourth switch 74 are open. Furthermore, the first control device 60, the third control device 63 and the fourth control device 64 are configured such that when the first switch 52 is open, the third switch 73 and the fourth switch 74 are closed.

In the actuator 10E, as illustrated in FIG. 13, upon the first switch 52 being closed, a voltage is applied to the conductive thin film 11b and the counter electrode 12, and the base electrode 11 and the counter electrode 12 are thereby attached to each other. In the actuator 10E, in a state in which the first switch 52 is on, the conductive thin film 11b and the counter electrode 12 are each electrically charged, and a Coulomb force is generated between the conductive thin film 11b and the counter electrode 12 via an insulation layer 11c. Upon the first switch 52 being opened, the voltage applied to the conductive thin film 11b and the counter electrode 12 vanishes, and furthermore, upon the Coulomb force vanishing, the base electrode 11 and the counter electrode 12 are detached from each other.

In the actuator 10E, when the first switch 52 is brought into an open state (off state) from a closed state (on state), as illustrated in FIG. 14, the third switch 73 and the fourth switch 74 are closed, whereby the conductive thin film 11b and the counter electrode 12 are grounded, respectively. Upon the conductive thin film 11b and the counter electrode 12 being grounded, electric charge in the conductive thin film 11b and electric charge in the counter electrode 12 are promptly eliminated. Therefore, a Coulomb force acting between the conductive thin film 11b and the counter electrode 12 is promptly eliminated, the counter electrode 12 promptly restores to its original shape and the counter electrode 12 is promptly detached from the base electrode 11. In this way, provision of the third switch 73 and the fourth switch 74 increases a response speed in the base electrode 11 and the counter electrode 12 being detached from each other when the first switch 52 is brought into an open state (off state) from a closed state (on state).

As described above, the actuator 10E includes the control devices 60, 63, 64 configured such that when the first switch 52 is closed, the third switch 73 and the fourth switch 74 are open and when the first switch 52 is open, the third switch 73 and the fourth switch 74 are closed. In the form illustrated in FIGS. 13 and 14, the actuator 10E is configured such that the first switch 52 is electrically operated by the first control device 60. Also, the actuator 10E is configured such that the third switch 73 is electrically operated by the third control device 63. Furthermore, the actuator 10E is configured such that the fourth switch 74 is electrically operated by the fourth control device 64. Therefore, the first switch 52, the third switch 73 and the fourth switch 74 are electrically operated promptly, and furthermore, operation timings of the respective switches are properly adjusted. Here, the first control device 60, the third control device 63 and the fourth control device 64 may be provided by separate control devices, respectively or may be provided by one or two control devices. The first control device 60, the third control device 63 and the fourth control device 64 can be provided by, for example, one or two microcomputers. As in the example indicated here, the actuator may have a further complicated structure. The actuator can perform more complicated operation by being operated by the control devices based on predetermined programs.

The actuator and actuator manufacturing method disclosed here have variously been described above. Unless otherwise specifically noted, the embodiments and the like of the actuator and actuator manufacturing method described here are not intended to limit the present disclosure.

What is claimed is:
1. An actuator comprising:
a base electrode;
a counter electrode facing the base electrode;
a first terminal connected to the base electrode; and
a second terminal connected to the counter electrode, wherein
the base electrode includes
a non-metal base material,
a conductive thin film disposed on a side of the non-metal base material, the side facing the counter electrode, and
an insulation layer disposed on the conductive thin film,
the first terminal is connected to the conductive thin film,
the counter electrode includes a flexible conductor that is deformable via a Coulomb force acting between the base electrode and the counter electrode upon application of a voltage to the first terminal and the second terminal,
a plurality of the base electrodes are arranged so as to face one another in turn,
the counter electrode is disposed between the base electrodes, and
wherein in the base electrode:
the non-metal base material includes a side having an uneven shape, the side facing the counter electrode,
the conductive thin film covers the uneven shape, and
the insulation layer covers the conductive thin film.
2. The actuator according to claim 1, wherein the insulation layer is a ceramic thin film.
3. The actuator according to claim 2, wherein the insulation layer has a perovskite structure.
4. The actuator according to claim 1, wherein the insulation layer is a non-woven fabric.
5. The actuator according to claim 1, wherein a conductive paste or a conductive gel is disposed between the conductive thin film and the insulation layer.
6. The actuator according to claim 1, wherein a cured conductive material is disposed between the conductive thin film and the insulation layer.
7. The actuator according to claim 1, wherein the conductive thin film is a metal thin film.
8. The actuator according to claim 1, wherein the counter electrode includes an elastomer containing a conductive material.
9. The actuator according to claim 1, further comprising:
a power supply that applies a voltage to the conductive thin film and to the counter electrode; and
a first switch that switches between connection and disconnection between the conductive thin film and the counter electrode, and the power supply.
10. The actuator according to claim 9, further comprising a control device that operates the first switch.
11. The actuator according to claim 9, further comprising:
a connection wiring that electrically connects the conductive thin film and the counter electrode with the power supply not interposed between the conductive thin film and the counter electrode; and
a second switch that is provided at the connection wiring and switches between a state in which the conductive thin film and the counter electrode are electrically connected via the connection wiring and a state in which the connection wiring is disconnected.
12. The actuator according to claim 11, further comprising a control device configured such that when the first switch is closed, the second switch is open and when the first switch is open, the second switch is closed.

13. The actuator according to claim 9, further comprising:
a first grounding wire that grounds the conductive thin film;
a second grounding wire that grounds the counter electrode;
a third switch that is provided at the first grounding wire and switches between connection and disconnection of the first grounding wire; and
a fourth switch that is provided at the second grounding wire and switches between connection and disconnection of the second grounding wire.

14. The actuator according to claim 13, further comprising a control device configured such that when the first switch is closed, the third switch and the fourth switch are open and when the first switch is open, the third switch and the fourth switch are closed.

* * * * *